(12) United States Patent
Pnueli et al.

(10) Patent No.: US 8,762,873 B2
(45) Date of Patent: Jun. 24, 2014

(54) GRAPHICAL USER INTERFACE COMPONENT IDENTIFICATION

(75) Inventors: Ayelet Pnueli, Haifa (IL); Omer Barkol, Haifa (IL); Ruth Bergman, Haifa (IL); Michael Pogrebisky, Rishon Le-Zion (IL); Sagi Schein, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 269 days.

(21) Appl. No.: 12/605,426

(22) Filed: Oct. 26, 2009

(65) Prior Publication Data

US 2011/0099499 A1    Apr. 28, 2011

(51) Int. Cl.
*G06F 3/048* (2013.01)

(52) U.S. Cl.
USPC .......................................... 715/771; 715/763

(58) Field of Classification Search
CPC ............ G05B 2219/32128; G05B 19/0426; G05B 2219/25067; G05B 2219/31469; G05B 2219/31472; G05B 2219/31474; G05B 2219/32342; G09G 2310/04
USPC ........................................................ 715/771
See application file for complete search history.

(56) References Cited

U.S. PATENT DOCUMENTS

| | | | |
|---|---|---|---|
| 6,157,736 A | 12/2000 | Jodoin et al. | |
| 7,266,243 B2 | 9/2007 | Dolan et al. | |
| 2003/0080956 A1* | 5/2003 | Chang | 345/419 |
| 2003/0229482 A1* | 12/2003 | Cook et al. | 703/14 |
| 2003/0236775 A1* | 12/2003 | Patterson | 707/3 |
| 2004/0001625 A1 | 1/2004 | Curry et al. | |
| 2004/0175036 A1 | 9/2004 | Graham | |
| 2005/0071769 A1* | 3/2005 | Suzuki et al. | 715/762 |
| 2005/0193368 A1* | 9/2005 | Becker et al. | 717/106 |
| 2005/0195221 A1* | 9/2005 | Berger et al. | 345/660 |
| 2005/0259871 A1 | 11/2005 | Li et al. | |
| 2006/0072823 A1 | 4/2006 | Maekawa | |
| 2006/0210158 A1 | 9/2006 | Pekar et al. | |
| 2008/0144942 A1* | 6/2008 | Besley et al. | 382/209 |
| 2009/0049427 A1* | 2/2009 | Zhao | 717/127 |
| 2009/0148039 A1 | 6/2009 | Chen et al. | |
| 2009/0199113 A1* | 8/2009 | McWhinnie et al. | 715/762 |
| 2009/0288023 A1* | 11/2009 | Hernandez et al. | 715/762 |
| 2010/0054618 A1* | 3/2010 | Kawazoe et al. | 382/239 |

FOREIGN PATENT DOCUMENTS

JP    2008003649 A  *  1/2008  .............. G06F 3/048

OTHER PUBLICATIONS

Byelas et al., Visualization of Areas of Interest in Component-Based System Architectures; © 2006; IEEE' 8 pages.*

* cited by examiner

*Primary Examiner* — Linh K Pham (57) ABSTRACT

Systems, methods, and other embodiments associated with graphical user interface (GUI) component identification are described. One example method includes identifying a set of GUI components. The identifying may be based on a screen image of a GUI. The screen image may comprise data describing a visual representation of the GUI. The example method may also include providing data identifying the set of GUI components.

12 Claims, 4 Drawing Sheets

GRAPHICAL USER INTERFACE COMPONENT IDENTIFICATION

BACKGROUND

A graphical user interface (GUI) is one technology that allows a person to interact with an underlying application. However, it is sometimes beneficial to allow a process to interact with the GUI. The process may facilitate observing, manipulating, repurposing, and/or summarizing the application associated with the GUI. For example, a repurposing logic may be designed to modify a GUI of a website for mobile devices. In another example, a software testing logic may track and replay user inputs to a GUI. Logics that interact with GUIs sometimes associate a specific functionality to individual elements of a GUI. This may require that the GUI be broken down into component elements. However, it can sometimes be difficult for a logic to determine where GUI components begin and/or end. Collecting data describing how GUI components are related to other nearby GUI components adds another layer of complexity to this task.

Conventional GUI segmentation techniques sometimes rely on information contained in a run time object hierarchy (e.g., a document object model (DOM)) to differentiate portions of a GUI. However, in some cases an object hierarchy may not exist or may not contain useful information. For example, a FLASH® application in a webpage may contain multiple GUI elements but the DOM for the website could describe the entirety of the FLASH® application as a single entity. In another example, some Web 2.0 development toolkits may not adequately describe semantic information for some run-time objects. Thus, when hierarchy information is unavailable, conventional GUI segmentation tools may be unable to accurately partition a GUI.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Systems and methods associated with graphical user interface (GUI) component identification are described. One example method includes identifying a set of GUI components. The GUI components may be identified from a screen image of a GUI. For example, image segmentation techniques for detecting straight lines may be used to detect a first group of GUI components. Image segmentation techniques for detecting commonly used GUI elements (e.g., check boxes, radio buttons) may be used to detect a different group of GUI components. Other image segmentation techniques may also be performed to detect GUI components in the screen image.

While additional information (e.g., user input, document object model (DOM)) may be used to verify or guide GUI component choices made using image segmentation techniques, some image segmentation techniques described may function without this information. This may facilitate identifying components in a GUI that does not have DOM information available. Additionally, because a GUI image is not a natural image (e.g., a photograph), techniques described may be more efficient for identifying GUI components than those used for identifying components of a natural image (e.g., identifying faces in a natural image).

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DOM: document object model.
DVD: digital versatile disk and/or digital video disk.
GUI: graphical user interface.
HTTP: hypertext transfer protocol.
LAN: local area network.
WAN: wide area network.
PCI: peripheral component interconnect.
PCIE: PCI express.
RAM: random access memory.
DRAM: dynamic RAM.
SRAM: static RAM.
ROM: read only memory.
PROM: programmable ROM.
USB: universal serial bus.

"Computer-readable medium", as used herein, refers to a medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software stored on a computer-readable medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"User", as used herein, includes but is not limited to one or more persons, software, computers or other devices, or combinations of these.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 1:
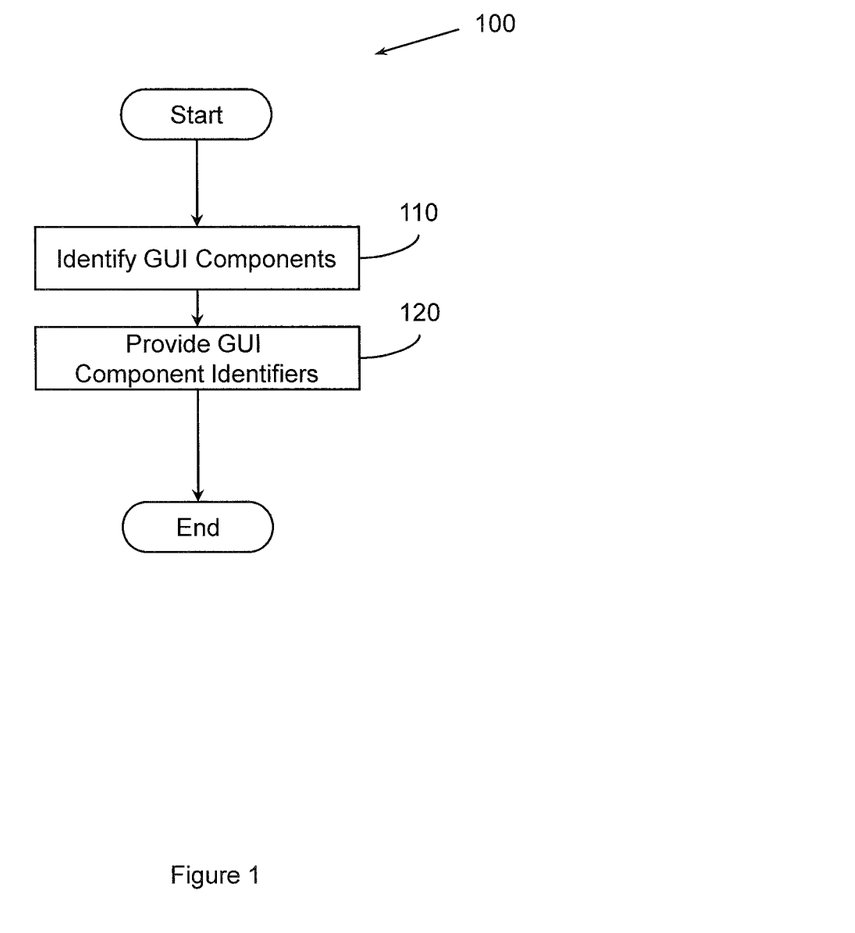
FIG. 1 illustrates an example embodiment of a method associated with GUI component identification.

FIG. 1 illustrates one embodiment of a method 100 associated with graphical user interface (GUI) component identification. Method 100 includes, at 110, identifying a set of GUI components. A GUI component may comprise a GUI element(s) that facilitates performing a task associated with the GUI. The GUI components may be identified by a device. The identifying at 110 may be based on a screen image of a GUI. The screen image may comprise data describing a visual representation of the GUI. The data describing the visual representation of the GUI may comprise color values describing pixels making up the screen image. In one example, the screen image is acquired by a screen capture operation (e.g., a screenshot). A screenshot is, for example, a non-interacting bitmap image (e.g., a graphics interchange format (GIF) image, a Joint Photographic Experts Group (JPEG) image). The identifying at 110 may also be based on a secondary source of information. For example, the secondary source of information may describe a GUI hierarchy (e.g., a document object model (DOM)). The secondary source of information may also be a user input. While a second source is described, it is not intended to limit additional sources of information to a single additional source of information. It may be appropriate to acquire additional information from multiple additional sources.

Identifying the set of GUI components may include detecting straight lines in the visual representation of the GUI. Detecting straight lines may include using edge detection techniques on a modification of the visual representation of the GUI. For example, transforming the visual representation of the GUI to the space of primary colors may make a portion of the GUI appear more distinct from a neighboring portion of the GUI in the modification of the visual representation of the GUI. When 4 straight lines are detected that form a rectangle, the portion of the GUI enclosed in the rectangle may be identified as a GUI component.

Identifying the set of GUI components may also comprise detecting a geometric shape in the visual representation of the GUI. The geometric shape may enclose a GUI component. Identifying the set of GUI components may also include identifying a frequently used shape in the visual representation of the GUI as a GUI component. A frequently used shape may be a shape found in a database of known shapes. A frequently used shape may also be a shape found in the GUI multiple times. Self similarity techniques may be used to identify frequently used shapes. Identifying the set of GUI components may also include matching a region in the visual representation of the GUI to a template describing a commonly used GUI component. For example, check boxes, radio buttons, text input boxes, and so on are GUI components that can be found across many different types of GUIs and often share similar visual appearances. Identifying the set of GUI components may also include identifying a textual GUI component. A textual GUI component may be identified using an optical character recognition technique, morphological operations, and so on.

By way of illustration, in some GUIs, GUI components are marked by an outline. Additionally, some GUI components are composed of lines as opposed to surfaces. Thus, edges can sometimes be detected by applying a linear line-detector filter. For example, to infer vertical lines with one pixel width in an image I, a kernel K=(−1, 2, −1) may be convolved with an image. Thus the equation $$(I * K)_{row,col} = \sum_{i=1}^{3} I_{row,col+i-2} \cdot K_i$$

may yield an image highlighting pixels that form vertical lines. An image highlighting pixels that form horizontal lines may be generated using K transposed. Similar kernels may be used to detect thicker lines.

Identifying the set of GUI components may also include identifying sub-components of a GUI component. A sub-component of a GUI component may comprise one or more elements of the GUI component that facilitate performing a task associated with the GUI component. For example, a GUI may have a GUI component for inputting financial information, a GUI component for inputting personal information, a GUI component for navigating to a different portion of the GUI, and so on. These GUI components may be identified by groups of straight lines forming rectangles surrounding the GUI components. The GUI components may include several sub-components for performing specific tasks associated with the component. For example, the personal identification GUI component may include a text entry box sub-component to enter a first name, a series of radio button sub-components to select a title (e.g., Mr., Ms.), a text entry box sub-component to enter an e-mail address, a check box sub-component to enable e-mail solicitations, and so on. Techniques for identifying sub-components of a GUI component may be similar to those described above for identifying a GUI component. In some GUIs it may be appropriate to further break down a sub-component, and so on. A person having ordinary skill in the art may recognize other techniques for identifying a component of a GUI based on image data. Further, while some specific examples are used in describing specific techniques above, a person having ordinary skill in the art may recognize other situations where the above techniques are applicable.

Method 100 also includes, at 120, providing data identifying the set of GUI components in the screen image. The data identifying the set of GUI components may be provided to a data store. The data store may store the data identifying the set of GUI components. The data identifying the set of GUI components may also be provided to a content repurposing application, a windows command and control application, a software testing application, a help application, an object recognition application, an application monitoring system, a search engine, an accessibility application, and so on.

In one example, the method 100 may also comprise extracting information describing attributes of members of the set of GUI components (not shown). The information describing attributes may be extracted from the screen image of the GUI. However, the information may also be extracted from a secondary source of information (e.g., a DOM). Information describing attributes may include information regarding size, background color, text, component type, and so on. A person having ordinary skill in the art may recognize other attributes worthy of information extraction.

In one example, the data identifying the set of GUI components may be provided to a GUI component identification logic. A GUI component identification logic may facilitate identifying what type of GUI element(s) is contained in a GUI component. This may allow a GUI hierarchy inference logic to generate a GUI hierarchy. A GUI hierarchy may be interpreted by a computer using a set of grammar rules to facilitate monitoring and/or understanding interactions between a user and a process through the GUI.

While FIG. 1 illustrates various actions occurring in serial, it is to be appreciated that various actions illustrated in FIG. 1 could occur substantially in parallel. By way of illustration, a first process could identify a set of GUI components and a second process could provide data identifying the set of GUI components. While two processes are described, it is to be appreciated that a greater and/or lesser number of processes could be employed and that lightweight processes, regular processes, threads, and other approaches could be employed.

In one example, the method may be implemented as computer executable instructions. Thus, in one example, a computer-readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

Figure 2:
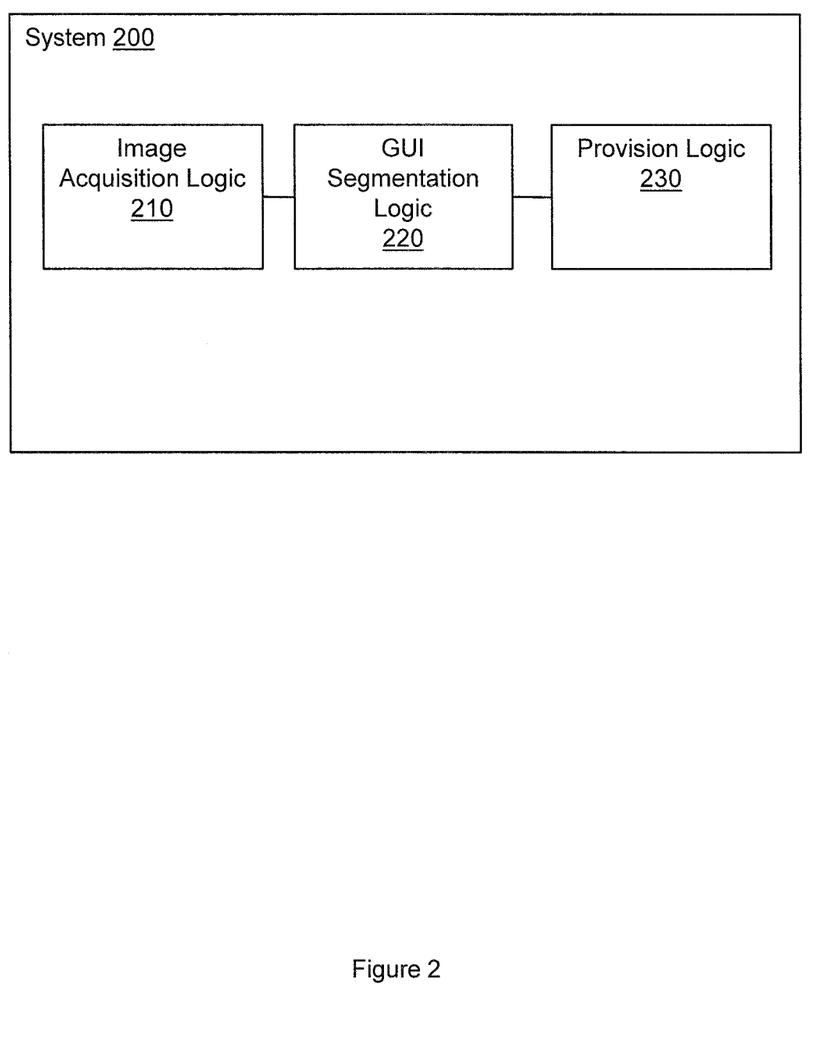
FIG. 2 illustrates an example embodiment of a system associated with GUI component identification.

FIG. 2 illustrates one embodiment of a system 200 associated with graphical user interface (GUI) component identification. System 200 includes image acquisition logic 210. Image acquisition logic 210 may generate a GUI image of a GUI instant—a state of a GUI between two consecutive inputs to a logic through the GUI. An input may be received from a mouse, a keyboard, and/or another input device. An input may also be inferred from a period of inactivity. A trigger that causes a change in the state of a GUI is an input. Thus, a GUI instant is a state of a GUI between two inputs. For example, a GUI may be in a first instant. A user may then select a menu button on top of the user interface using a mouse causing a menu of options to drop down. The GUI is now in a second instant. If the user were to let go of the mouse button, the GUI may enter a third instant. The third instant may be similar to the first instant if the user did not select an option from the menu.

However, a GUI instant may not all be visible in one screen image. For example, a user may have to scroll down a long webpage to access GUI components at the bottom of the webpage. In this case, the GUI components at the top of the webpage and the GUI components at the bottom of the webpage may be part of the same instant. This is consistent with the above, as scrolling down the web page is providing inputs to the web browser interface and not the webpage interface itself. Thus, in one example, the image acquisition logic may generate the GUI image by combining multiple images of the GUI instant into a single image. This may be appropriate when an entire GUI does not fit onto a single screen. Cases where a GUI may not fit into a single screen may include mobile applications (e.g., fitting a webpage into a small display area), accessibility applications (e.g., modifying a GUI for a person with poor eyesight), and so on. In another example, image acquisition logic 210 may receive the GUI image from an external source. Additionally, image acquisition logic 210 may prepare the GUI image for a GUI segmentation technique described herein.

System 200 also includes GUI segmentation logic 220. GUI segmentation logic 220 may divide the GUI image into a set of operational segments. An operational segment may be a portion of a GUI that facilitates performing a task associated with the GUI. System 200 also includes provision logic 230. Provision logic 230 may provide data identifying the set of operational segments.

Figure 3:
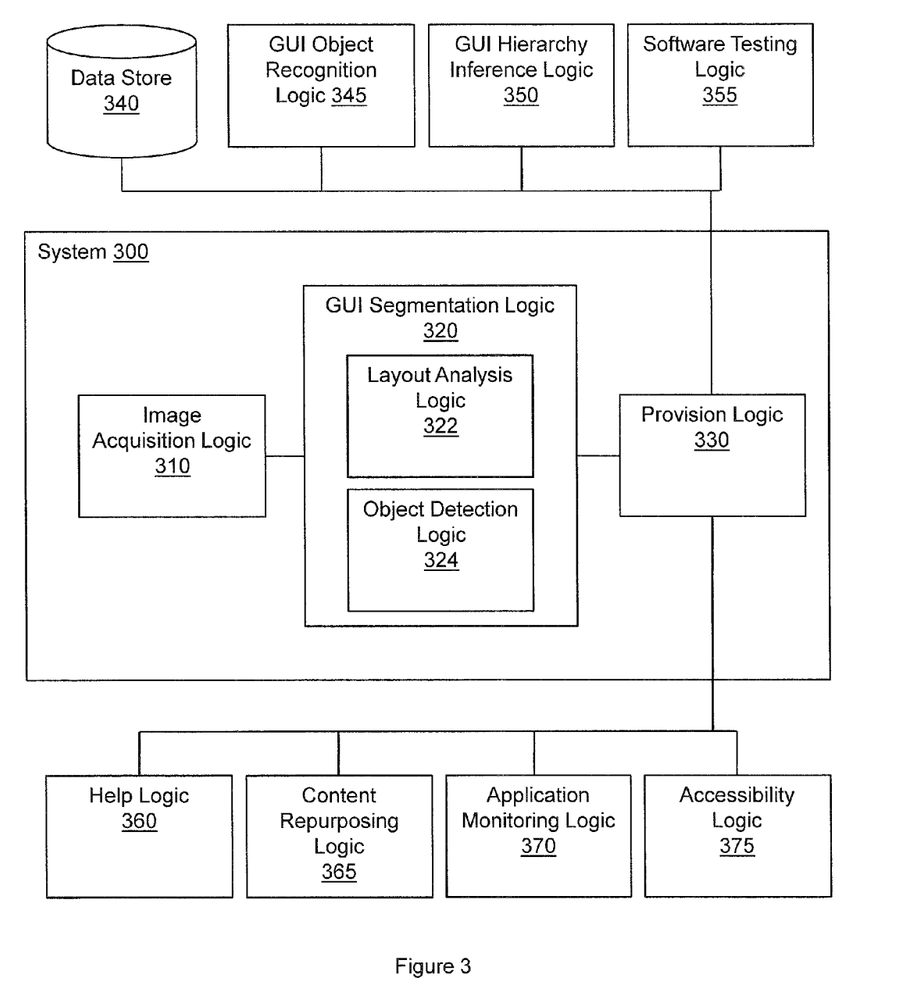
FIG. 3 illustrates an example embodiment of a system associated with GUI component identification.

FIG. 3 illustrates one embodiment of a system 300 associated with graphical user interface (GUI) component identification. System 300 includes several items similar to those described in connection with system 200 (FIG. 2). For example, system 300 includes image acquisition logic 310 to generate a GUI image, GUI segmentation logic 320 to divide the GUI image into a set of operational segments, and provision logic 330 to provide data identifying the set of operational segments. However, system 300 includes additional elements.

For example, segmentation logic 320 includes 2 sub logics, layout analysis logic 322 and object detection logic 324. Object detection logic 324 may facilitate, for example, detecting straight lines in the GUI image, identifying a frequently used shape in the GUI image, matching a region of the GUI image to a template, recognizing text in the GUI image, performing statistical analysis on a portion of the GUI image, verifying object detection decisions against a non-image data source, and so on. Layout analysis logic 322 may recursively divide portions of the GUI image to create a GUI image hierarchy. By way of illustration, layout analysis logic 322 could detect high level components using an edge detection technique. A GUI image hierarchy may facilitate gathering information about GUI components. A GUI image hierarchy may also facilitate establishing relationships between GUI elements. In one example, layout analysis logic 322 may examine a GUI component found by object detection logic 324 and determine if the GUI component contains sub-components. Layout analysis logic 322 may then control object detection logic 324 to perform an action to identify a sub-component of the GUI component as described above.

In FIG. 3, provision logic 330 is connected to several possible destinations for the data identifying the set of operational segments. For example, provision logic 330 may provide the data identifying the set of operational segments to a data store 340 so that data store 340 can store the data for later use. In another example, the data identifying the set of operational segments may be provided to GUI object recognition logic 345. GUI Object recognition logic 345 may facilitate identifying what type(s) of GUI element is contained in an operational segment. In another example, the data identifying the set of operational segments may be provided to GUI hierarchy inference logic 350. The GUI hierarchy inference logic 350 may collect information describing how operational segments are related to one another based on, for example, special relationships between operational segments in the GUI image. The data identifying the operational segments may also be provided to a logic configured to observe, manipulate, repurpose, and/or summarize an application associated with the GUI image. Example logics may include software testing logic 355, help logic 360, content repurposing logic 365, application monitoring logic 370, accessibility logic 375, and so on. A person having ordinary skill in the art may recognize other logics that may benefit from receiving data describing a segmented GUI.

By way of illustration, logic on a mobile device may attempt to take a website meant for a computer and modify it so that the website fits on the mobile device. The logic may first build the website and then generate an image of the website as the website would appear at full size. The logic may then send the image to an image segmentation system similar to system 300. The image segmentation system may then return a set of boundaries of portions of the image describing the GUI components of the website. The mobile device may then organize them so that they fit better into a mobile device. In one example, the mobile device may arrange them vertically so that the user does not have to scroll the webpage both horizontally and vertically.

Figure 4:
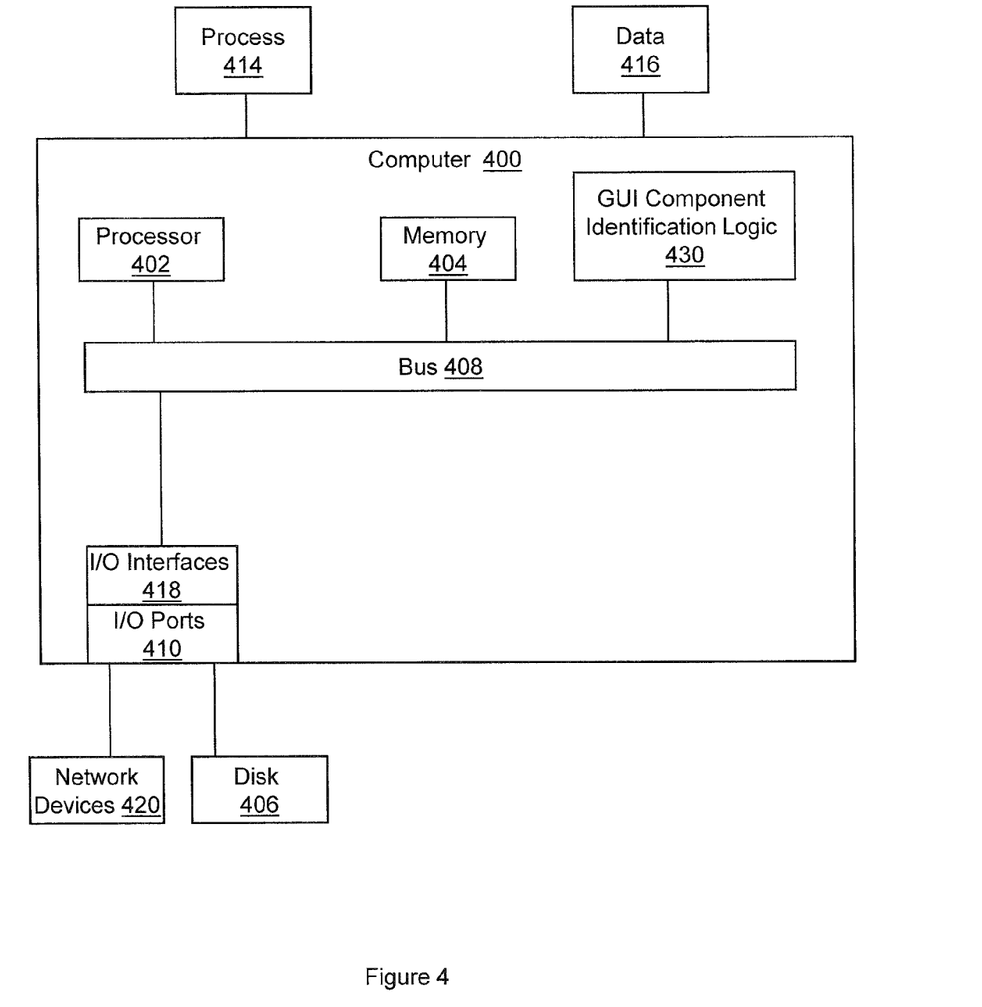
FIG. 4 illustrates an example embodiment of a computing environment in which example systems and methods, and equivalents, may operate.

FIG. 4 illustrates one embodiment of an example computing device in which example systems and methods described herein, and equivalents, may operate. The example computing device may be a computer 400 that includes a processor 402, a memory 404, and input/output ports 410 operably connected by a bus 408. In one example, the computer 400 may include a GUI component identification logic 430 configured to facilitate segmenting a GUI based on image data. In different examples, the logic 430 may be implemented in hardware, software stored on a computer-readable medium, firmware, and/or combinations thereof. While the logic 430 is illustrated as a hardware component attached to the bus 408, it is to be appreciated that in one example, the logic 430 could be implemented in the processor 402.

Thus, logic 430 may provide means (e.g., hardware, software stored on a computer-readable medium, firmware) for acquiring image data describing a graphical user interface (GUI). The means may be implemented, for example, as an ASIC. The means may also be implemented as computer executable instructions that are presented to computer 400 as data 416 that are temporarily stored in memory 404 and then executed by processor 402. Logic 430 may also provide means (e.g., hardware, software stored on a computer-readable medium, firmware) for automatically identifying a set of GUI components in the image data. Logic 430 may also provide means (e.g., hardware, software stored on a computer-readable medium, firmware) for providing data identifying the set of GUI components.

Generally describing an example configuration of the computer 400, the processor 402 may be a variety of various processors including dual microprocessor and other multiprocessor architectures. A memory 404 may include volatile memory and/or non-volatile memory. Non-volatile memory may include, for example, ROM, PROM, and so on. Volatile memory may include, for example, RAM, SRAM, DRAM, and so on.

A disk 406 may be operably connected to the computer 400 via, for example, an input/output interface (e.g., card, device) 418 and an input/output port 410. The disk 406 may be, for example, a magnetic disk drive, a solid state disk drive, a floppy disk drive, a tape drive, a Zip drive, a flash memory card, a memory stick, and so on. Furthermore, the disk 406 may be a CD-ROM drive, a CD-R drive, a CD-RW drive, a DVD ROM, and so on. The memory 404 can store a process 414 and/or a data 416, for example. The disk 406 and/or the memory 404 can store an operating system that controls and allocates resources of the computer 400.

The bus 408 may be a single internal bus interconnect architecture and/or other bus or mesh architectures. While a single bus is illustrated, it is to be appreciated that the computer 400 may communicate with various devices, logics, and peripherals using other busses (e.g., PCIE, 1394, USB, Ethernet). The bus 408 can be types including, for example, a memory bus, a memory controller, a peripheral bus, an external bus, a crossbar switch, and/or a local bus.

The computer 400 may interact with input/output devices via the i/o interfaces 418 and the input/output ports 410. Input/output devices may be, for example, a keyboard, a microphone, a pointing and selection device, cameras, video cards, displays, the disk 406, network devices 420, and so on. The input/output ports 410 may include, for example, serial ports, parallel ports, and USB ports.

The computer 400 can operate in a network environment and thus may be connected to the network devices 420 via the i/o interfaces 418, and/or the i/o ports 410. Through the network devices 420, the computer 400 may interact with a network. Through the network, the computer 400 may be logically connected to remote computers. Networks with which the computer 400 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform a method, the method comprising:
  identifying, by a device, a set of graphical user interface (GUI) components by at least two of:
   detecting straight lines in the visual representation of the GUI, where the straight lines create a rectangle enclosing a GUI component;
   detecting a geometric shape in the visual representation of the GUI, where the geometric shape encloses a GUI component;
   identifying a frequently used shape in the visual representation of the GUI as a GUI component;
   matching a region in the visual representation of the GUI to a template describing a commonly used GUI component;
   identifying a textual GUI component; and
   identifying sub-components of a GUI component;
  where the identifying of the set of GUI components is based on screen images that make up a GUI instance and GUI segmentation logic, where the screen images comprise data describing a visual representation of the GUI, and where the set of GUI components comprise one or more GUI elements that facilitate performing a task that the GUI performs;
  performing segmentation by using GUI segmentation logic, that is not based on any input from a user, to divide the screen images of the GUI into the set of GUI components;
  providing data identifying the set of GUI components in the screen images; and
  combining the screen images using the identified set of GUI components into a single screen image of the GUI instance.

2. The non-transitory computer-readable medium of claim 1, where the data identifying the set of GUI components is provided to one or more of, a data store to store the data identifying the set of GUI components, a content repurposing application, a windows command and control application, a software testing application, a help application, an object recognition application, an application monitoring system, a search engine, and an accessibility application.

3. The non-transitory computer-readable medium of claim 1, where the data describing the visual representation of the GUI comprises color values describing pixels making up the screen images.

4. The non-transitory computer-readable medium of claim 1, where a sub-component of a GUI component comprises one or more elements of the GUI component that facilitate performing a task associated with the GUI component, and where identifying a sub-component of a GUI component comprises one or more of:
  detecting straight lines in a visual representation of the GUI component, where the straight lines create a rectangle enclosing the sub-component of the GUI component;
  identifying a frequently used shape in the visual representation of the GUI component as the sub-component of the GUI component;
  matching a region in the visual representation of the GUI component to a template describing a commonly used GUI component;
  classifying a textual sub-component of the GUI component; and
  recursively identifying sub-components of the sub-component.

5. The non-transitory computer-readable medium of claim 1, where identifying the set of GUI components is also based on a secondary source of information.

6. The non-transitory computer-readable medium of claim 5, where the secondary source of information is a document object model (DOM).

7. The non-transitory computer-readable medium of claim 1, comprising extracting, from the screen images of the GUI, information describing attributes of members of the set of GUI components.

8. A system, comprising:
  a processor and memory device including:
  image acquisition logic to:
   generate graphical user interface (GUI) images of a GUI instant; and
   identify a set of operational segments, wherein the set of operational segments is identified by at least two of:
    detecting straight lines in the visual representation of the GUI, where the straight lines create a rectangle enclosing a GUI component;
    detecting a geometric shape in the visual representation of the GUI, where the geometric shape encloses a GUI component;
    identifying a frequently used shape in the visual representation of the GUI as a GUI component;
    matching a region in the visual representation of the GUI to a template describing a commonly used GUI component;
    identifying a textual GUI component; and
    identifying sub-components of a GUI component;
   generate a single GUI image by combining the GUI images based on the identified set of operational segments;
  GUI segmentation logic that is not based on any user input to divide the GUI images into the set of operational segments, wherein the set of operational segments facilitate performing a task that the GUI instance facilitates; and
  provision logic to provide the data identifying the set of operational segments;
  where a GUI instant is a state of a GUI between two consecutive inputs to a logic through the GUI.

9. The system of claim 8, where the GUI images are combined by combining the set of operational segments into the single GUI image.

10. The system of claim 8, where the GUI segmentation logic comprises one or more of,
  layout analysis logic, and
  object detection logic.

11. The system of claim 10, where the layout analysis logic is configured to recursively divide portions of the GUI images of the GUI instance to create a GUI image hierarchy.

12. A computer-implemented method, comprising:
  acquiring image data from images describing a graphical user interface (GUI), wherein a GUI instance comprises the images;
  automatically identifying a set of GUI components in the image data from the images of the GUI instance by at least two of:

detecting straight lines in the visual representation of the GUI, where the straight lines create a rectangle enclosing a GUI component;
detecting a geometric shape in the visual representation of the GUI, where the geometric shape encloses a GUI component;
identifying a frequently used shape in the visual representation of the GUI as a GUI component;
matching a region in the visual representation of the GUI to a template describing a commonly used GUI component;
identifying a textual GUI component; and
identifying sub-components of a GUI component;
where the automatic identification of the set of GUI components uses segmentation logic and where the set of GUI components comprise one or more GUI elements that facilitate performing a task that the GUI performs;
performing segmentation by using GUI segmentation logic, that is not based on any input from a user, to divide the image data into the set of GUI components;
providing electronic data identifying the set of GUI components;
combining the images into a single image of the GUI instance based on the provided electronic data identifying the set of GUI components.

* * * * *